United States Patent [19]

Phaal et al.

[11] Patent Number: 4,861,350
[45] Date of Patent: Aug. 29, 1989

[54] TOOL COMPONENT

[76] Inventors: Cornelius Phaal, 34 Rutland Avenue, Craighall Park; Richard P. Burnand, 39 Constantia Avenue, Alan Manor, both of Johannesburg, Transvaal, South Africa

[21] Appl. No.: 233,976

[22] Filed: Aug. 18, 1988

Related U.S. Application Data

[63] Continuation of Ser. No. 898,612, Aug. 21, 1986, abandoned.

[30] Foreign Application Priority Data

Aug. 22, 1985 [ZA] South Africa .................. 85/6379

[51] Int. Cl.[4] .............................................. B24D 3/04
[52] U.S. Cl. ........................................ 51/307; 51/295; 51/297; 51/204; 175/329; 175/410
[58] Field of Search ............... 51/297, 307, 309, 293, 51/204, 209 R, 206 R, 206 NF, 206 P, 207; 76/DIG. 12; 175/410, 329; 125/39

[56] References Cited

U.S. PATENT DOCUMENTS

| 2,070,156 | 2/1937 | DeBats . | |
|---|---|---|---|
| 3,356,599 | 12/1967 | Weiss . | |
| 4,109,737 | 8/1978 | Bovenkerk | 175/329 |
| 4,156,374 | 5/1979 | Shwayder . | |
| 4,311,490 | 1/1982 | Bovenkerk et al. | 51/293 |
| 4,457,765 | 7/1984 | Wilson | 51/209 R |
| 4,478,298 | 10/1984 | Hake et al. . | |
| 4,498,549 | 2/1985 | Jurgens . | |
| 4,505,251 | 3/1985 | Stoll . | |
| 4,505,746 | 3/1985 | Nakai et al. | 76/DIG. 12 |
| 4,604,106 | 8/1986 | Hall et al. | 51/293 |

FOREIGN PATENT DOCUMENTS

| 0042750 | 3/1980 | Japan | 51/204 |
|---|---|---|---|
| 0079881 | 5/1983 | Japan | 51/204 |
| 2151283 | 7/1985 | United Kingdom | 175/329 |

Primary Examiner—Frederick R. Schmidt
Assistant Examiner—Robert A. Rose
Attorney, Agent, or Firm—Scully, Scott, Murphy & Presser

[57] ABSTRACT

A tool component is provided which comprises an abrasive compact bonded to a cemented carbide support body. The abrasive compact has two zones which are joined by an interlocking, common boundary. The one zone provides the cutting edge or point for the tool component while the other zone is bonded to the cemented carbide support body. In use, the tool component is so located in the working surface of the tool that the lower zone is partially embedded in that surface. The interlocking, common boundary is located above the working surface.

9 Claims, 1 Drawing Sheet

U.S. Patent     Aug. 29, 1989     4,861,350
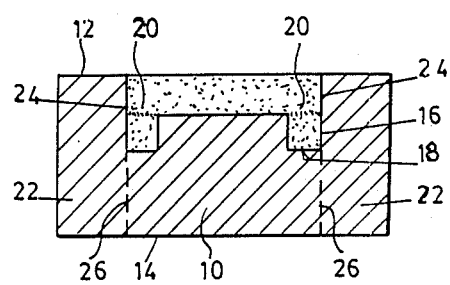
FIG _1
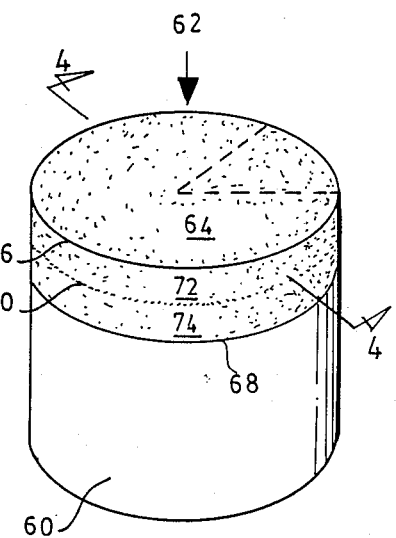
FIG _3
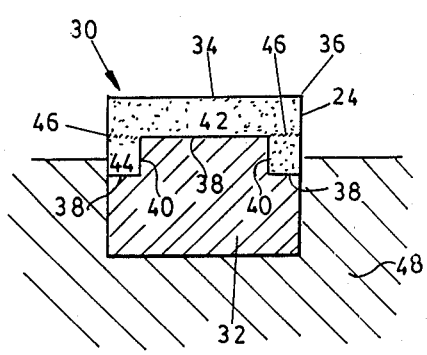
FIG _2
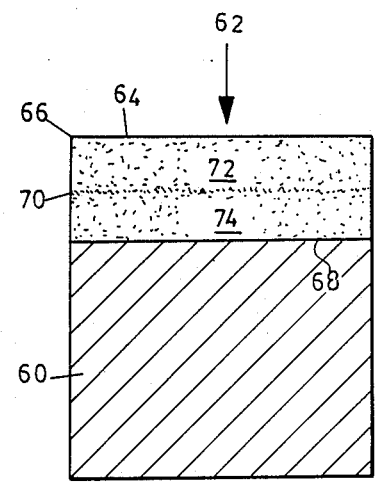
FIG _4

TOOL COMPONENT

This application is a continuation of application Ser. No. 898,612, filed 8/21/86 now abandoned.

BACKGROUND OF THE INVENTION

This invention relates to a tool component.

A composite abrasive compact consists of an abrasive compact bonded to a cemented carbide support. The abrasive compact will invariably be a diamond or cubic boron nitride compact. Composite abrasive compacts may be used as tool components in a variety of operations such as cutting, turning and drilling.

Composite diamond abrasive compacts have particular application as cutting components for drill bits. An edge of the abrasive compacts provides the cutting edge for the component. In use, chips of rock strike the cemented carbide support in a region close to the abrasive compact. These chips can cause wear and subsequent undercutting of the carbide in this region. The effective working life of the cutting component is shortened as a result. Similar problems are encountered when composite abrasive compacts are used in mining picks and in cutting tools.

SUMMARY OF THE INVENTION

According to the present invention there is provided a tool component comprising an abrasive compact bonded to a cemented carbide support body, the abrasive compact comprising:

a polycrystalline mass of ultra-hard abrasive particles bonded into a hard conglomerate and containing at least 70 percent by volume of ultra-hard abrasive particles, a major surface on each of opposite sides thereof, one major surface presenting a cutting edge or point for the tool component, the other major surface being bonded to the cemented carbide support body, two zones joined by an interlocking, common boundary, one zone being produced from ultra-hard abrasive particles and extending from the common boundary to the major surface providing the cutting edge or point, and the second zone being produced from a mixture of ultra-hard abrasive particles and carbide particles or ultra-hard abrasive particles coarser than those used for producing the first zone and extending from the common boundary to the major surface bonded to the cemented carbide support.

Further according to the invention there is provided a tool such as a drill bit, a mining pick or cutting tool comprising a working surface and a tool component as described above located in the working surface such that it presents a cutting edge or point for the tool and the abrasive compact extends below the working surface.

According to yet another aspect of the invention, there is provided a method of making a tool component as described above including the steps of:

providing a cemented carbide support body having major flat surfaces on each of opposite sides thereof, forming a cavity in one of the major flat surfaces, placing a first layer of ultra-hard abrasive particles as hereinafter defined in the cavity, placing a second layer of ultra-hard abrasive particles as hereinafter defined on the first layer, placing the loaded carbide body in the reaction zone of a high pressure/high temperature apparatus, subjecting the loaded carbide body to conditions of elevated temperature and pressure suitable for compact manufacture, allowing the conditions to return to ambient, recovering the carbide body from the reaction zone, and removing carbide from the sides of the body to expose side surfaces of the thus formed abrasive compact.

In one form of this method, the first layer comprises ultra-hard abrasive particles and the second layer comprises ultra-hard abrasive particles finer than those of the first layer.

In a second form of this method, the first layer comprises a mixture of ultra-hard abrasive particles and carbide particles and the ultrahard abrasive particles of the second layer are of any suitable size.

DESCRIPTION OF THE DRAWINGS

FIG. 1 illustrates a loaded carbide support body for use in the method of the invention:

FIG. 2 illustrates a tool component of the invention located in the working surface of a tool:

FIG. 3 illustrates a perspective view of a second embodiment of a tool component: and FIG. 4 is a section along the line 4—4 of FIG. 3.

DETAILED DESCRIPTION OF THE INVENTION

In the tool component of the invention, the second zone of the abrasive compact is produced from a mixture of ultra-hard abrasive particles and carbide particles or ultra-hard abrasive particles coarser than those used for producing the first zone. The second zone is thus abrasive. In use, the second zone will generally be embedded in the working surface of the tool such that the common boundary between the first and second zones lies above the working surface. This means that the cemented carbide support body lies entirely below the working surface and is protected from wear and undercutting during use of the tool. Chips produced during use of the tool strike the abrasive compact which is better able to withstand the abrasive effect thereof.

When the second zone comprises a mixture of ultra-hard abrasive particles and carbide particles, the mixture may also contain a small quantity of a suitable binder metal such as cobalt, nickel or iron. Alternatively, the mixture may simply consist of the ultra-hard abrasive particles and the carbide particles. The carbide particles are typically tungsten carbide particles.

The abrasive compact may be made using conditions and materials known in the art. The abrasive particle content of the abrasive compact is preferably 80 to 90 percent by volume.

The two zones of the abrasive compact may also contain a second phase or bonding matrix which contains a catalyst/solvent useful in synthesising the abrasive particles. In a preferred form of the invention, the ultra-hard abrasive particles are diamond particles and the two zones contain a second phase or bonding matrix containing cobalt, nickel or iron. The source of the cobalt, nickel or iron will be the cemented carbide support body from whence it infiltrates during manufacture of the tool component.

The size of the abrasive particles used for producing the first zone will preferably be fine, i.e. have a particle size of less than 75 microns. The particles used for producing the second zone may be relatively coarse particles, typically having a size of 100 to 150 microns.

The two zones are joined by an interlocking, common boundary which will generally be diffuse in nature as the two zones are made simultaneously and not in separate and distinct steps and thereafter bonded together.

The two major surfaces of the abrasive compact are typically separated by a depth or distance of 2 to 4 millimeters. Generally, the distance between the common boundary and each of these major surfaces is about the same.

In one form of the invention, the major surface of the abrasive compact which is bonded to the cemented carbide support body is inwardly recessed. This recess is typically centrally located in the major surface.

A first embodiment of the invention will now be described with reference to FIGS. 1 and 2 of the accompanying drawing. Referring to FIG. 1, there is shown a disc-shaped cemented carbide support body 10 having major flat surfaces 12 and 14 on opposite sides thereof. The major flat surface 12 has formed therein a cavity 16. The cavity 16 is circular in plan and has around its periphery an annular zone 18 of greater depth.

A mass of coarse diamond particles of particles size 125 to 150 microns is placed in the annular zone 18 to the level indicated by the line 20. A layer of fine diamond particles, typically having a size of 25 microns or less, is then placed in the cavity to fill it to the major surface 12.

The loaded cemented carbide support body is then placed in the reaction zone of a conventional high pressure/high temperature apparatus and the pressure raised to 50 kilobars and the temperature raised to 1500° C. These elevated conditions of temperature and pressure are maintained for a period of 10 minutes whereafter the conditions are allowed to return to ambient. Recovered from the reaction zone is a cemented carbide disc having a diamond abrasive compact formed in the cavity 16 thereof. The diamond abrasive compact consists, for example, of a polycrystalline mass of diamond particles present in an amount of about 85 percent by volume and a second phase of cobalt. The cobalt for the diamond compact infiltrates into the diamond mass during compact manufacture from the carbide body 10.

A cutting component is produced from this body by grinding away the outer zone 22 of the cemented carbide disc until the diamond compact side surfaces 24 and the dotted line 26 is reached. This produces a cutting component, as illustrated in FIG. 2. Referring now to FIG. 2, it will be seen that the cutting component comprises an abrasive compact 30 bonded to a cemented carbide support body 32. The compact 30 has an upper circular major flat surface 34 which provides a cutting edge 36. The abrasive compact also has a lower major surface 38 stepped at 40. The surface 38 is firmly bonded to the cemented carbide support body 32.

The abrasive compact consists of two zones 42, 44 having an interlocking, common boundary 46. Since the two zones are produced simultaneously and are, in fact, different zones of the same compact the common boundary is somewhat diffuse. The lower zone 44 is located in the peripheral region in the support body created by the step 40.

It will be noted that the cutting component is so located in the working surface 48 of the tool that the zone 44 is partially embedded in the surface. The interlocking, common boundary 46 lies above the working surface. In use, it is the edge 36 which is the operative cutting edge for the tool. Chips which fly off this edge during operation of the tool will strike the wear-resistant compact and not the cemented carbide support body 32 which is completely protected from the abrasive action of these chips.

A second embodiment of the invention will now be described with reference to FIGS. 3 and 4. Referring to these figures, a tool component comprises a cemented carbide support body 60 bonded to a diamond abrasive compact 62. The diamond abrasive compact has an upper major surface 64 which presents a cutting edge 66. The abrasive compact also has a lower major surface 68 which is bonded to the cemented carbide support body 60. The abrasive compact consists of two zones 72, 74 joined by an interlocking, common boundary 70. The upper zone 72 is made from diamond particles having a particle size of less than 100 microns while the lower zone 74 is made of diamond particles having a particle size in the range 125 to 150 microns or a mixture of such particles with carbide particles.

This tool component is manufactured in a similar manner to that described for producing the tool component of FIGS. 1 and 2 save that the recess 16 is not provided with an annular zone 18 of greater depth.

In use, this tool component will be located in the working surface of a tool such that the major surface 68 of the compact lies below the working surface. It is thus only diamond abrasive compact which is exposed to the abrasive and wear action of chips during use.

The illustrated embodiments each provide a circular cutting edge. Included within the scope of the invention are tool components having different shapes. Tool components of a variety of shapes may be produced from either of the two illustrated embodiments. For example, tool components having a segmental shape in plan, as illustrated by the dotted lines in FIG. 3, may be produced. Examples of other useful tool components are those having rectangular, pentagonal or hexagonal shapes in plan.

We claim:

1. A tool for engaging a work material, comprising:
   a body defining a working surface; and
   a tool component including a cemented carbide support body having a top surface; and an abrasive compact bonded to the support body, and including a polycrystalline mass of ultra-hard abrasive particles bonded into a hard conglomerate and containing at least 70 percent by volume of ultra-hard abrasive particles, the polycrystalline mass including:
   (i) first and second major surfaces on opposite sides of the polycrystalline mass, the first major surface forming a cutting edge or point to engage and cut the work material, the second major surface being bonded to the support body, and
   (ii) upper and lower layers joined together by an interlocking, common boundary,
   the upper layer comprising ultra-hard abrasive particles, extending upward from said common boundary and over the top surface of the carbide support body, and forming the first major surface of the polycrystalline mass,
   the lower layer comprising particles selected from the group consisting of (a) ultra-hard abrasive particles coarser than the abrasive particles used to form the upper layer, and (b) a mixture of ultra-hard abrasive particles and carbide particles, the lower layer extending downward from said common boundary and forming the second major surface of the polycrystalline mass;

wherein the tool component is recessed in the working surface with the cutting edge or point of the tool component located above the working surface, with the common boundary joining the upper and lower layers of the polycrystalline mass also located above the working surface and with the lower layer of the polycrystalline mass extending below the top surface of the support body and surrounding the support body beneath the working surface;

wherein the working surface and the abrasive compact completely enclose the carbide support body to protect the carbide support body from cut pieces of the work material.

2. A tool according to claim 1 wherein the first and second major surfaces are separated by two to four millimeters.

3. A tool according to claim 1 wherein the distance between the common boundary and the first major surface is about the same as the distance between the common boundary and the second major surface.

4. A tool according to claim 1 wherein the sizes of the particles comprising the upper layer are less than 75 microns.

5. A tool according to claim 1 wherein the second major surface is inwardly stepped and provides a peripheral region recessed in the support body, and the lower layer is located in said peripheral region.

6. A tool according to claim 1 wherein the ultra-hard abrasive particles of the upper layer are diamond particles, and the ultra-hard abrasive particles of the lower layer are diamond particles.

7. A tool according to claim 1, wherein the tool is a drill bit, mining pick or cutting tool.

8. A tool according to claim 1, wherein:
the upper layer consists of ultra-hard abrasive particles having particle sizes less than 100 micrometers; and
the lower layer consists of ultra-hard abrasive particles having particle sizes between 125–150 micrometers.

9. A tool according to claim 8, wherein the upper layer consists of ultra-hard abrasive particles having particle sizes of 25 micrometers or less.

* * * * *